United States Patent
Icardi

(10) Patent No.: US 9,351,602 B2
(45) Date of Patent: May 31, 2016

(54) INFUSION APPARATUS FOR A MACHINE FOR PREPARING BEVERAGES

(75) Inventors: Danilo Icardi, Turin (IT); Sergio Icardi, legal representative, Turin (IT); Maria Teresa Giaretto, legal representative, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 207 days.

(21) Appl. No.: 13/993,874

(22) PCT Filed: Dec. 15, 2011

(86) PCT No.: PCT/IB2011/055696
§ 371 (c)(1),
(2), (4) Date: Jun. 13, 2013

(87) PCT Pub. No.: WO2012/085774
PCT Pub. Date: Jun. 28, 2012

(65) Prior Publication Data
US 2014/0261001 A1 Sep. 18, 2014

(30) Foreign Application Priority Data
Dec. 24, 2010 (IT) .............................. TO2010A1058

(51) Int. Cl.
A47J 31/00 (2006.01)
A47J 31/40 (2006.01)
A47J 31/36 (2006.01)

(52) U.S. Cl.
CPC ............ *A47J 31/407* (2013.01); *A47J 31/3633* (2013.01); *A47J 31/3638* (2013.01); *A47J 31/3676* (2013.01)

(58) Field of Classification Search
CPC .............. A47J 31/3638; A47J 31/3633; A47J 31/3628; A47J 31/3695; A47J 31/368; A47J 31/3676

USPC ...................................... 99/289 R, 295, 302 P
See application file for complete search history.

(56) References Cited

U.S. PATENT DOCUMENTS 5,776,527 A * 7/1998 Blanc .............................. 426/77
7,703,380 B2 * 4/2010 Ryser et al. ..................... 99/295
(Continued)

FOREIGN PATENT DOCUMENTS

| EP | 1 721 553 A1 | 11/2006 |
| EP | 2 044 867 A1 | 4/2009 |

(Continued)

OTHER PUBLICATIONS

International Search Report of PCT/IB2011/055696 dated Feb. 6, 2012.

*Primary Examiner* — Reginald L Alexander
(74) *Attorney, Agent, or Firm* — Sughrue Mion, PLLC

(57) ABSTRACT

The apparatus comprises a support and guide structure with a movable assembly and a cooperating assembly. The movable assembly couples with the cooperating assembly to define an infusion chamber. Between the two assemblies is provided a gripper type holding device, with a pair of movable jaws for receiving and retaining a capsule. The jaws opened by means for releasing the capsule when the movable assembly approaches the closing position. The opening has associated reaction means to keep it in an advanced position, when the movable assembly approaches the closing position. In an end phase of the displacement of the movable assembly the gripper type holding device urges the opening member towards a rearward position, and in an initial phase of the return displacement of the movable assembly the opening member maintains the gripper type holding device with the jaws wide open to release the capsule.

5 Claims, 10 Drawing Sheets

(56) References Cited

U.S. PATENT DOCUMENTS

| | | | |
|---|---|---|---|
| 8,613,246 B2 * | 12/2013 | Ryser et al. | 99/289 R |
| 8,647,691 B2 * | 2/2014 | Kruger | 426/431 |
| 8,770,095 B2 * | 7/2014 | Pecci et al. | 99/295 |
| 8,904,922 B2 * | 12/2014 | Pagano | 99/295 |
| 2009/0007794 A1 * | 1/2009 | Cortese | 99/289 R |
| 2009/0249961 A1 * | 10/2009 | Cheng | 99/289 R |

FOREIGN PATENT DOCUMENTS

| | | |
|---|---|---|
| WO | 2006/005736 A2 | 1/2006 |
| WO | 2006/013124 A1 | 2/2006 |

\* cited by examiner

INFUSION APPARATUS FOR A MACHINE FOR PREPARING BEVERAGES

CROSS REFERENCE TO RELATED APPLICATIONS

This application is a National Stage of International Application No. PCT/IB2011/055696 filed Dec. 15, 2011, claiming priority based on Italian Patent Application No. TO2010A001058, filed Dec. 24, 2010, the contents of all of which are incorporated herein by reference in their entirety.

The present invention relates to an infusion apparatus for a machine for preparing beverages, particularly coffee, by using capsules or the like, containing a respective quantity or dose of a substance for the preparation of a beverage.

More specifically, the subject of the invention is an infusion apparatus of the type comprising a support and guide structure, stationary in operation, in which there are mounted
a movable assembly and
an associated cooperating assembly, which is substantially stationary;
the movable assembly being adapted to assume a closing position in which it couples with the cooperating assembly to define therewith an infusion chamber, and a spaced-apart opening position;
between said assemblies there being provided a gripper type holding device, including a pair of movable jaws, adapted to assume a relative holding position in which they are capable of receiving and retaining a capsule or the like, introduced between the assemblies while the latter are in the spaced-apart opening position;
said jaws being adapted to be opened by opening means for releasing the held capsule, when said movable assembly approaches the closing position, to allow the capsule to be positioned in the infusion chamber.

Infusion apparatuses of this type are described in WO-2006/005736-A and in EP 1 721 553-A. The infusion apparatuses according to the prior art comprise a holding device with jaws which is integral with the stationary locating assembly cooperating with the movable assembly. In the apparatus according to WO-2006/005736-A the jaws of the holding device can be pivoted in a vertical plane, about horizontal axes. In the apparatus according to EP 1 721 553-A the jaws can be pivoted in a horizontal plane, about respective vertical axes.

It is an aim of the present invention to propose an improved infusion apparatus.

These and other aims are achieved according to the invention by means of an apparatus of the type specified above, characterized primarily in that the opening means comprise a bearing structure associated with one of said assemblies and an opening member movable with respect to said bearing structure in the direction of displacement of the movable assembly;
the opening member has associated with it reaction means tending to keep it in an advanced position in which, when the movable assembly approaches the closing position, said member is capable of interfering with the gripper type holding device and causing the jaws thereof to be opened wide;
the arrangement being such that
in an end phase of the displacement of the movable assembly towards the closing position the gripper type holding. device, with the jaws wide open, is capable of urging the opening member towards a rearward position, against the action of the associated reaction means, and in an initial phase of the return displacement of the movable assembly towards the opening position, the opening member, under the action of said reaction means, is capable of maintaining the gripper type holding device with the jaws wide open for a predetermined stroke of the movable assembly, suitable for allowing the exhausted capsule to be released.

Other features and advantages of the invention will become clear from the following detailed description, which is given purely by way of non-limiting example, with reference to the appended drawings, in which.

Figure 1:
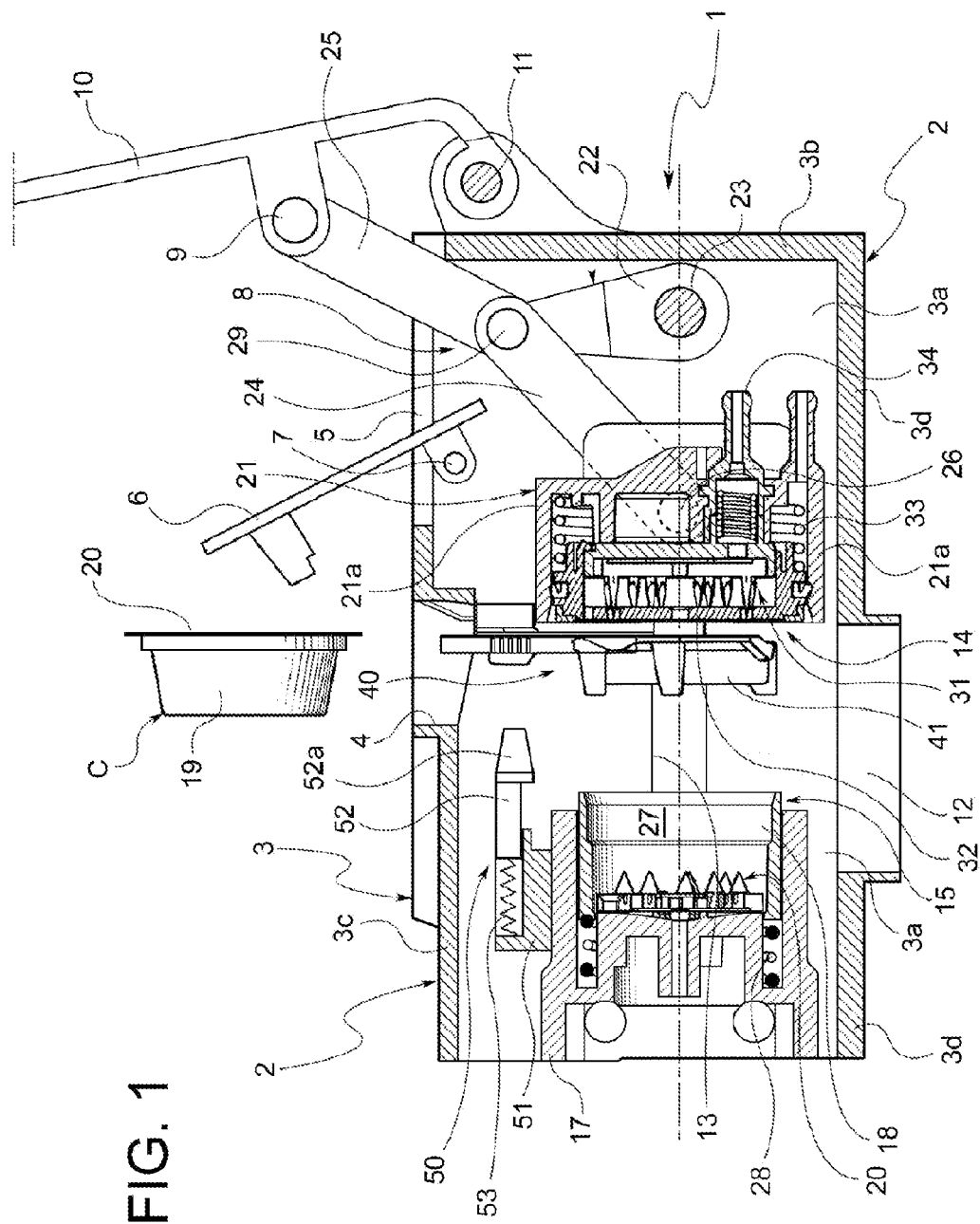
FIG. 1 is a partial side view, partly in section, of an infusion apparatus according to the present invention, shown in the rest state.

In the drawings, the reference 1 indicates as a whole an infusion apparatus according to the present invention for a machine for preparing beverages, particularly hot beverages, such as coffee, by using capsules or wafers.

The infusion apparatus 1 is intended to be incorporated in a machine for preparing beverages which is of a type known per se and therefore not illustrated.

The infusion assembly 1 comprises a support and guide structure 2, stationary in operation. In the exemplary embodiment illustrated, the structure 2 comprises a box-like body 3, of substantially parallelepipedal shape, having two main vertical lateral walls 3a facing each other, a vertical end wall 3b, a top wall 3c, and a bottom wall 3d.

In the top wall 3c of the body 3 an aperture 4 (FIGS. 1 and 2) is provided for the introduction of a capsule C containing a quantity or dose of a substance for the preparation of the beverage. The substance may for example be ground roasted coffee.

In the top wall 3c there is also provided an aperture or slot 5 (FIGS. 1 and 2), via which can be pivotally mounted a pusher member 6 which can pivot about a horizontal axis 7. Through the opening or slot 5 there also extends a kinematic motion means indicated as a whole by 8, hinged at 9 to an actuating lever 10, which is itself hinged to the body 3 about a horizontal axis 11.

The structure and functions of the kinematic motion means 8 will be more fully described hereinafter.

In the bottom wall 3d of the body 3 a discharge aperture 12 is provided for the discharge of the exhausted capsules or wafers C.

In the facing lateral walls 3a of the body 3, two horizontal guide slots 13 are provided, the functions of which are explained hereinafter.

Figure 2:
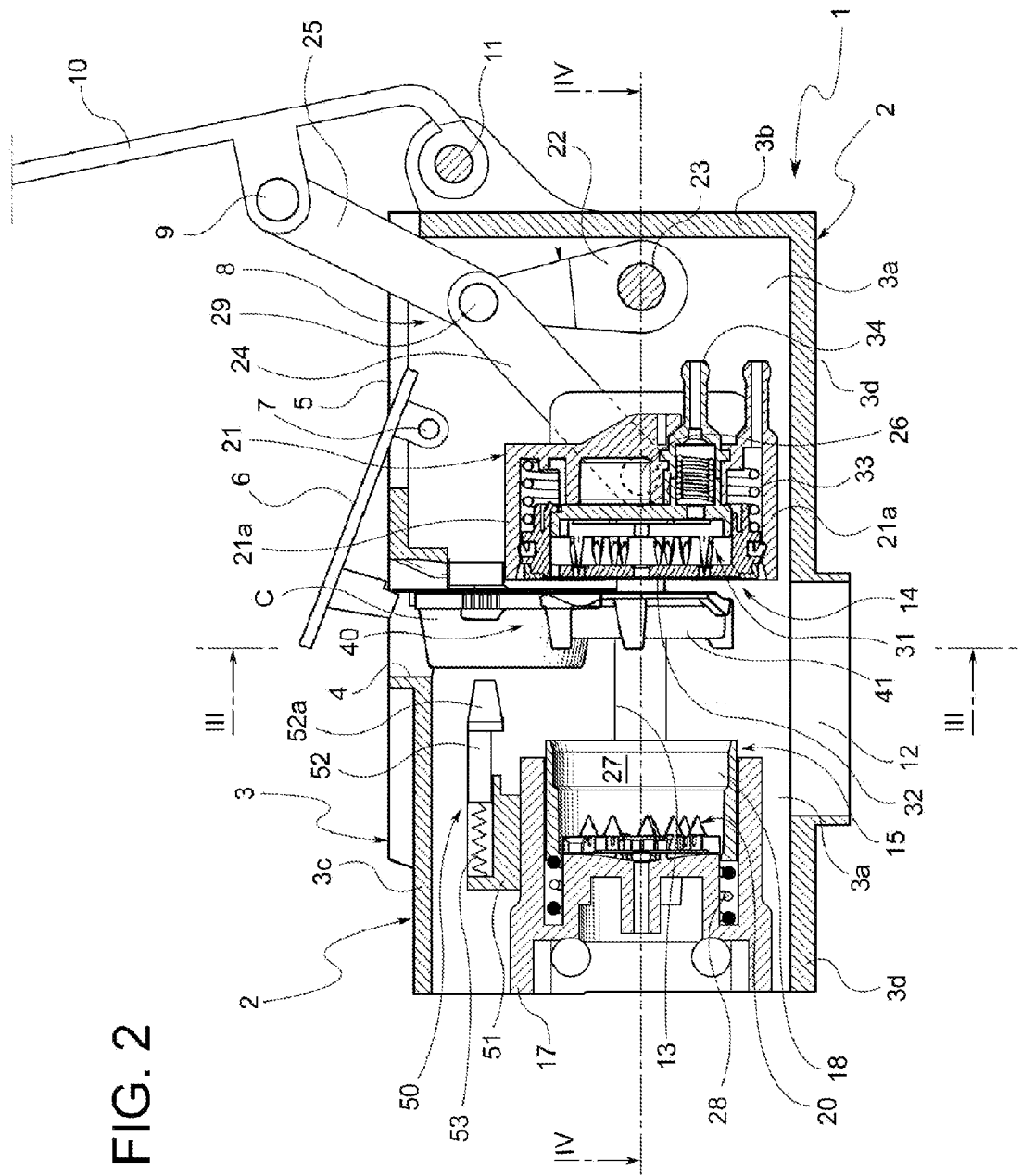
FIG. 2 is a view similar to that provided in FIG. 1, and shows the infusion apparatus in a step of introduction of a capsule.
Figure 4:
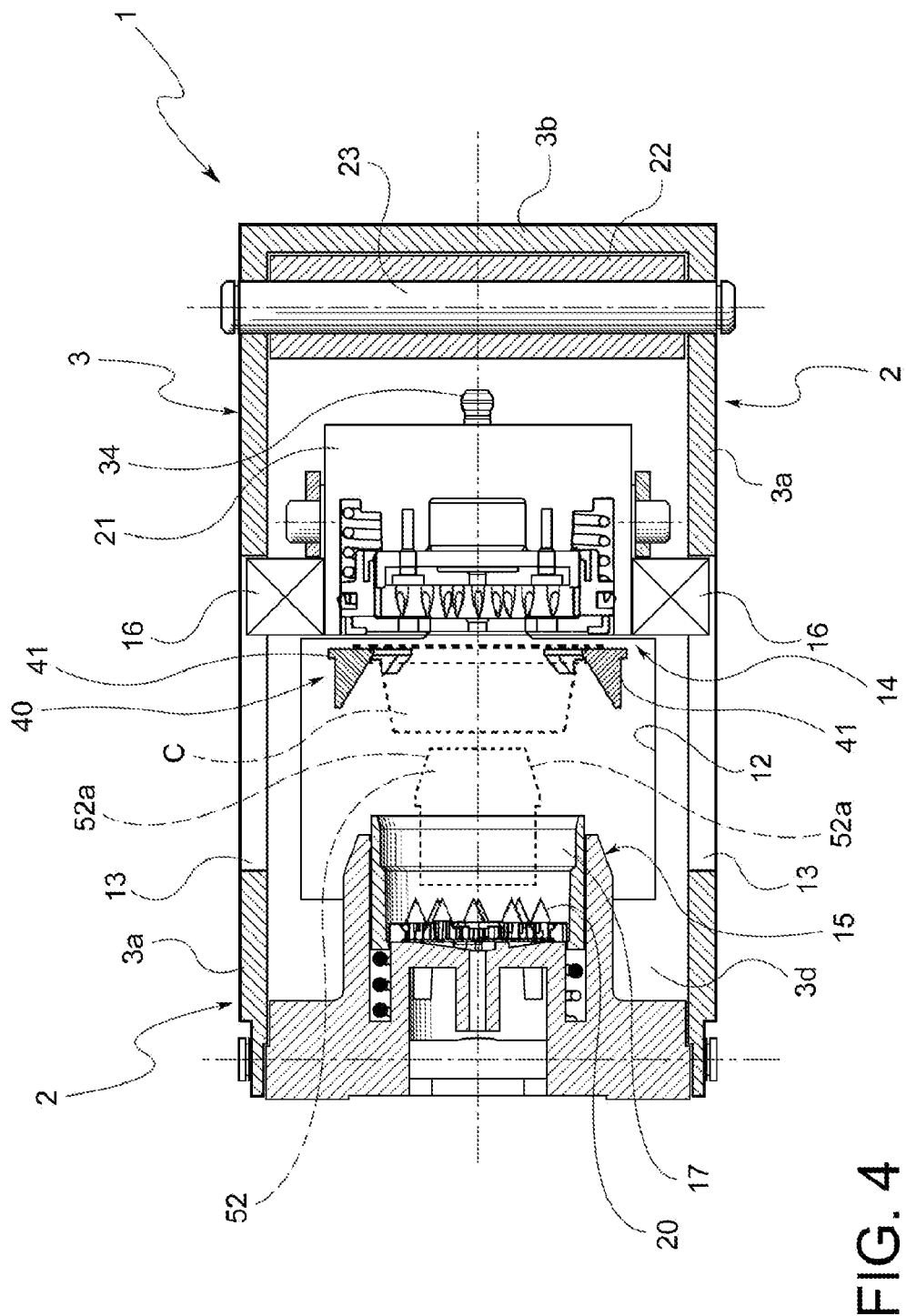
FIG. 4 is a sectional view approximately along the line IV-IV of FIG. 2.

With particular reference to FIGS. 1, 2 and 4, mounted in the body 3 are a movable assembly 14 and an associated cooperating assembly 15 which is substantially stationary. The assemblies 14 and 15 are opposite each other.

As can be seen for example in FIG. 4, the movable assembly 14 has two opposed lateral protuberances 16, each mounted for guided sliding in a respective guide slot 13 of the body 3. The movable assembly 14 can therefore be translated horizontally, along the guide slots 13, away from and towards the cooperating assembly 15. The latter has a stationary hollow body 17, in which there is mounted so as to be translatable to a limited extent a body 27 substantially in the shape of a cup, in which there is defined a cavity 18 suitable for receiving a capsule or wafer C for preparing a beverage. With the body 18 there may be associated a spring 28 tending to keep it in a state partially withdrawn from the body 17, towards the movable assembly 14.

With particular reference to FIG. 1, the capsule C illustrated in the drawings is of a type known per se, and comprises a cup-shaped body 19, for example made of moulded plastics material, closed by a sealing lid 20, the rim of which protrudes radially.

Arranged in the cavity 18 of the body 17 is a perforating device 20, of a type known per se, comprising a plurality of sharp points, capable of lacerating the bottom of the cup-shaped body 19 of a capsule C (FIGS. 1, 2 and 4).

In a manner which is known per se, the cavity 27 of the body 18 is connected to a pipe for delivering the beverage to a collecting container, not illustrated, such as a cup or glass.

The movable assembly 14 comprises a support body 21 connected in a hinged manner to the kinematic motion means 8.

In the exemplary embodiment illustrated, the kinematic motion means 8 comprises a crank type member 22, mounted to rotate about a horizontal pin 23, mounted transversely in the body 3. The crank element 22 is hinged at 29 to respective first ends of two connecting rods 24 and 25. The connecting rod 24 has the other end hinged at 26 to the body 21 of the movable assembly 14 (FIGS. 1 and 2). The connecting rod 25 has its other end hinged at 9 to the actuating lever 10.

The kinematic motion means 8 described above is such that rotation of the control lever 10 about the axis 11, in an anti-clockwise and respectively clockwise direction, is capable of bringing about the translation of the movable assembly 14 towards and, respectively, away from the associated stationary cooperating assembly 15.

Although in the embodiment illustrated in the drawings the movement of the movable assembly 14 with respect to the cooperating assembly 15 is manually controlled, it is obvious to persons skilled in the art that such movement may be initiated and controlled also by means of an actuating device, for example of the electrical or hydroelectric type.

In the embodiment illustrated, the body 21 of the movable assembly 14 is substantially bell-shaped, with a cylindrical shell 21a open towards the cooperating assembly 15. Inside the shell 21a is mounted a perforating device 31 of a type known per se, comprising a plurality of perforated sharp points, facing towards the cooperating assembly 15. The points are capable of extending through corresponding apertures arranged in a perforated front plate 32, mounted to be movable in the shell 21a of the body 21. A helical spring 33, arranged in the shell, tends to keep the perforated plate 32 in the position illustrated in FIGS. 1 and 2, in which it is not penetrated by the points of the perforating device 31.

The body 21 of the movable assembly 14 has an inlet connector 34 (FIGS. 1 and 2) for supplying a flow of hot water (and optionally steam) to the pointed perforating device 31, for injection into the infusion chamber which, as will be more fully described hereinafter, is defined when the movable assembly 14 is coupled to the cooperating assembly 15.

The arrangement described above is such that the movable assembly 14 is capable of assuming, relative to the cooperating assembly 15, an opening position, shown in FIGS. 1 and 2, in which, into the interstice comprised between the assemblies 14 and 15, it is possible to introduce a capsule or wafer C for the preparation of a beverage.

Figure 10:
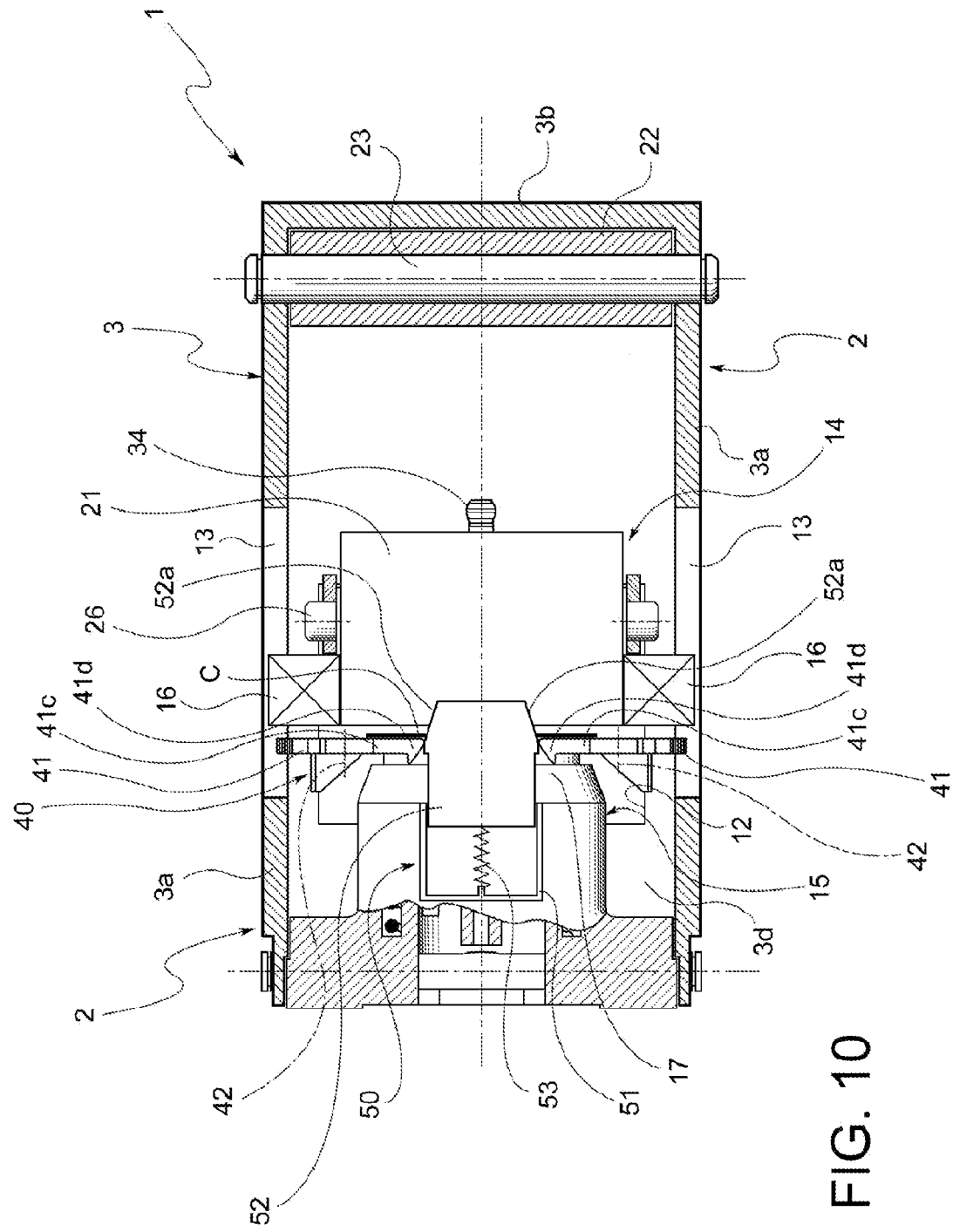

The movable assembly 14 is also capable of assuming a closing position, shown in FIG. 10, in which it is coupled in a liquid-tight manner to the cooperating assembly 15, such as to define an infusion chamber in which a capsule or wafer C is operatively arranged.

Figure 3:
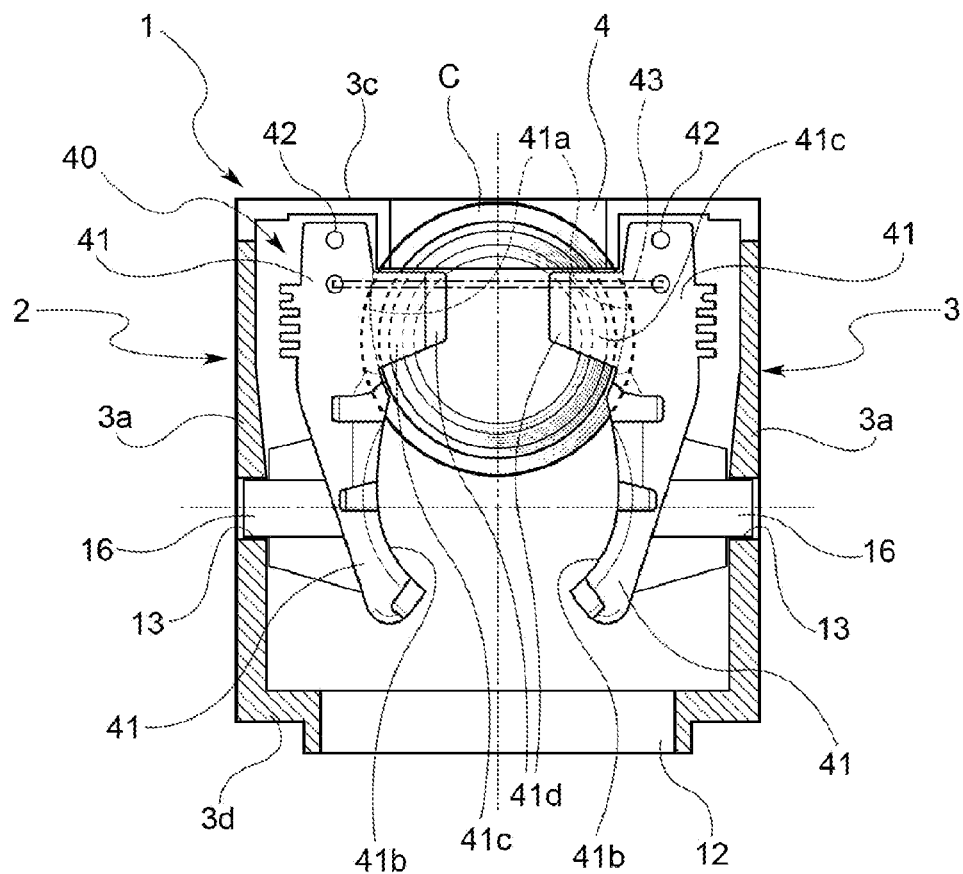
FIG. 3 is a sectional view along the line of FIG. 2.
Figure 5:
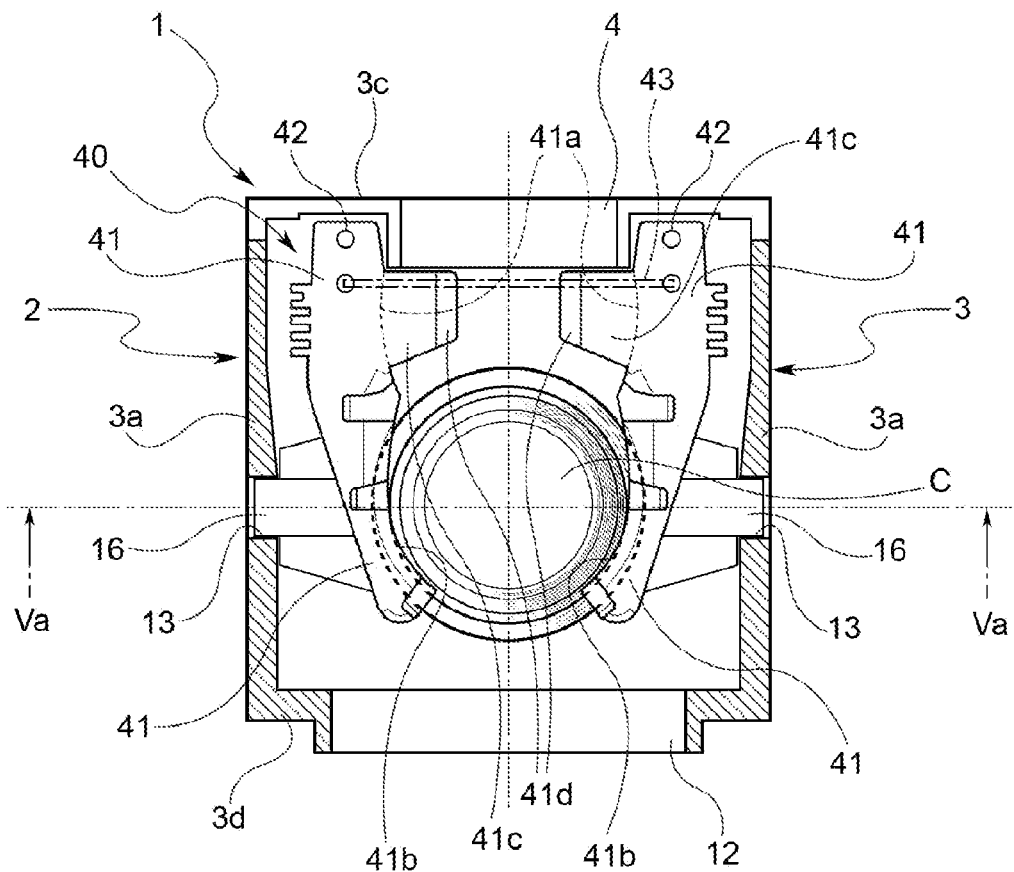
FIG. 5 is a view similar to that provided in FIG. 3, and shows the gripper type holding device with the jaws holding a capsule in alignment with the movable assembly and the associated cooperating assembly.
Figure 5A:
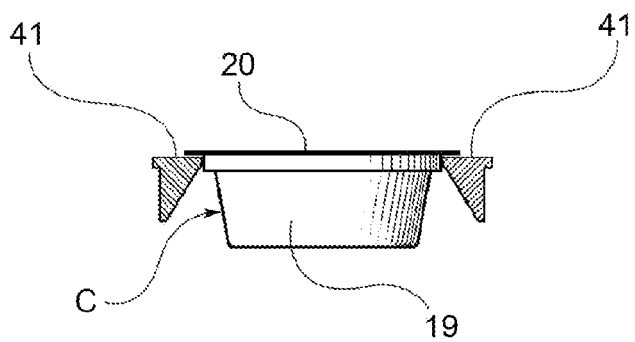

Between the movable assembly 14 and the cooperating assembly 15, in particular on the movable assembly 14, a gripper type holding device, indicated as a whole by 40, is provided. The device comprises, in a manner known per se, a pair of jaws 41, mounted so as to be pivotal transversely about respective, preferably horizontal, pins 42 (FIGS. 3 and 5). A resilient member 43 (FIGS. 3 and 5) interconnects the jaws 41, in the vicinity of their respective fulcrums 42, and tends to maintain them in an adjacent or "closed" state.

With reference to FIGS. 3 and 5, the jaws 41 have respective concave proximal arcuate profiles 41a, close to the pins 42, and respective concave distal arcuate profiles 41b.

The arrangement is such that when a capsule or wafer C is introduced through the aperture or slot 4 of the support body 3, it is held so that it bears on the proximal arcuate profiles 41a of the jaws 41, as shown in FIGS. 2 and 3.

Subsequently, by means of the pusher member 6, the capsule C can be urged further downwards, causing its body to interfere with the tips defined between the arcuate profiles 41a and 41b of the jaws 41, first of all effecting the opening of the jaws 41, counter to the return action of the resilient member 43, and then permitting the jaws to be brought close together again, so as to receive and retain the capsule C between the distal arcuate profiles 41b of the jaws, as shown in FIG. 5.

With reference to FIGS. 3, 5 and onwards, the jaws 41 have respective opposed transverse appendages 41c which at the distal ends form respective feeler protuberances 41d facing towards the cooperating assembly 15.

Figure 6:
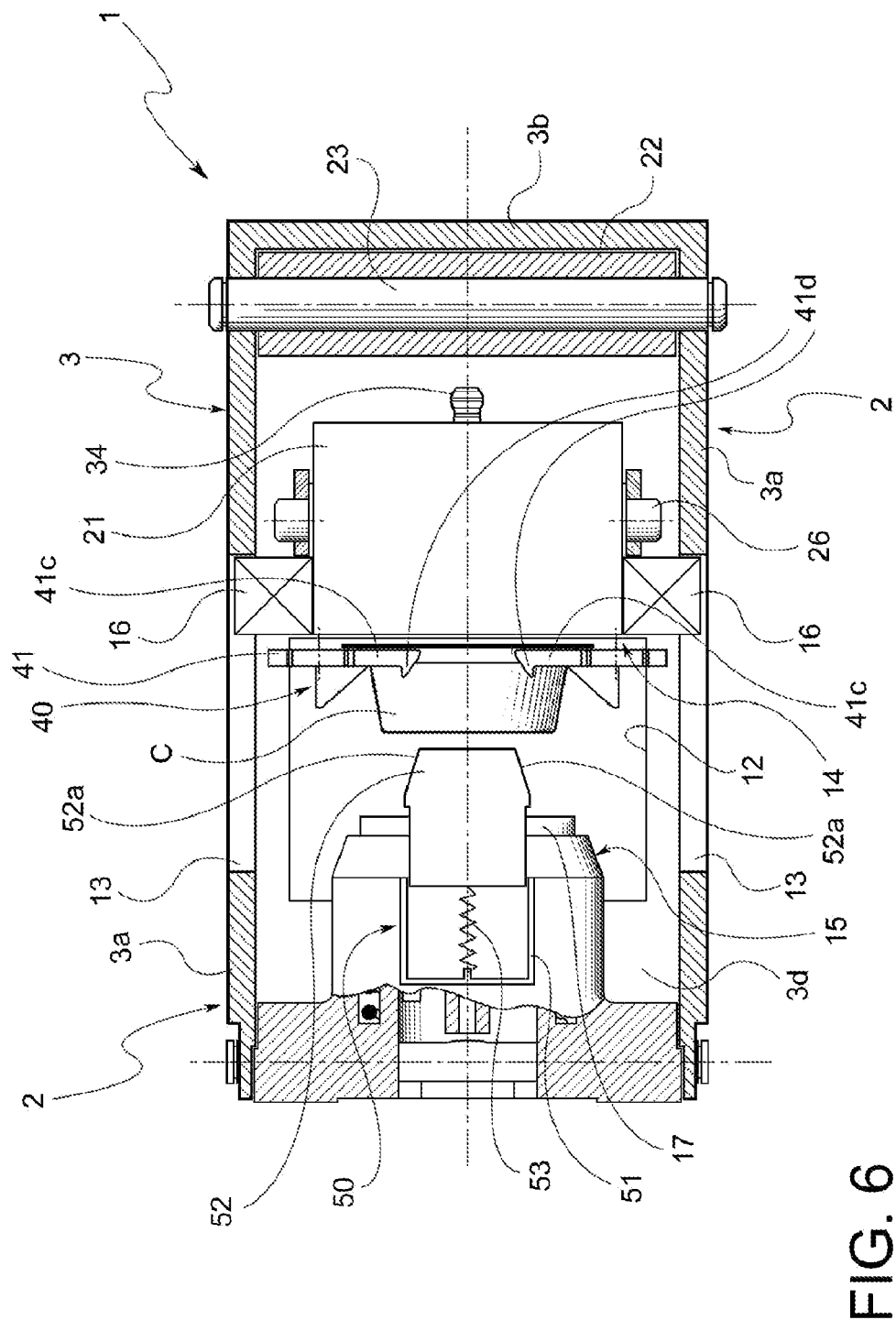
FIGS. 6 and 7 are plan views from above, partly in section, which show the infusion apparatus at two successive moments of a step of closure of the infusion chamber.

With particular reference to FIGS. 1 and 2, associated with the body 17 of the cooperating assembly 15 there is an opening means indicated as a whole by 50. The opening means comprise a stationary bearing structure 51, in which there is mounted to be horizontally translatable, parallel to the direction of displacement of the movable assembly 14, an opening member 52 (see also FIG. 6 and onwards).

Associated with the opening member 52 is a fairly rigid reaction spring 53 tending to keep it in an advanced position (FIGS. 6 to 9) in which it extends towards the movable assembly 14.

The distal end portion of the opening member 52 has two slanted surfaces or planes 52a, symmetrical to each other and converging in the direction of the movable assembly 14. The surfaces or planes 52a are intended to cooperate with the feeler protuberances 41d of the jaws 41, in the manner which is described hereinafter.

The infusion apparatus 1 described above functions substantially in the following manner.

For the preparation of a fresh beverage a wafer or capsule C is introduced into the slot 4 of the support body 3. The capsule is first received and supported between the proximal arcuate profiles 41a of the jaws 41, as shown in FIGS. 2 and 3.

By means of the pusher member 6, the capsule C introduced may be caused to drop further, until it is received and retained between the distal arcuate profiles 41b of the aforesaid jaws (FIG. 5).

By means of the control lever 10, the movable assembly 14 can then be translated in the direction of the cooperating assembly 15, as is shown by the sequence of FIGS. 6 to 10.

Figure 7:
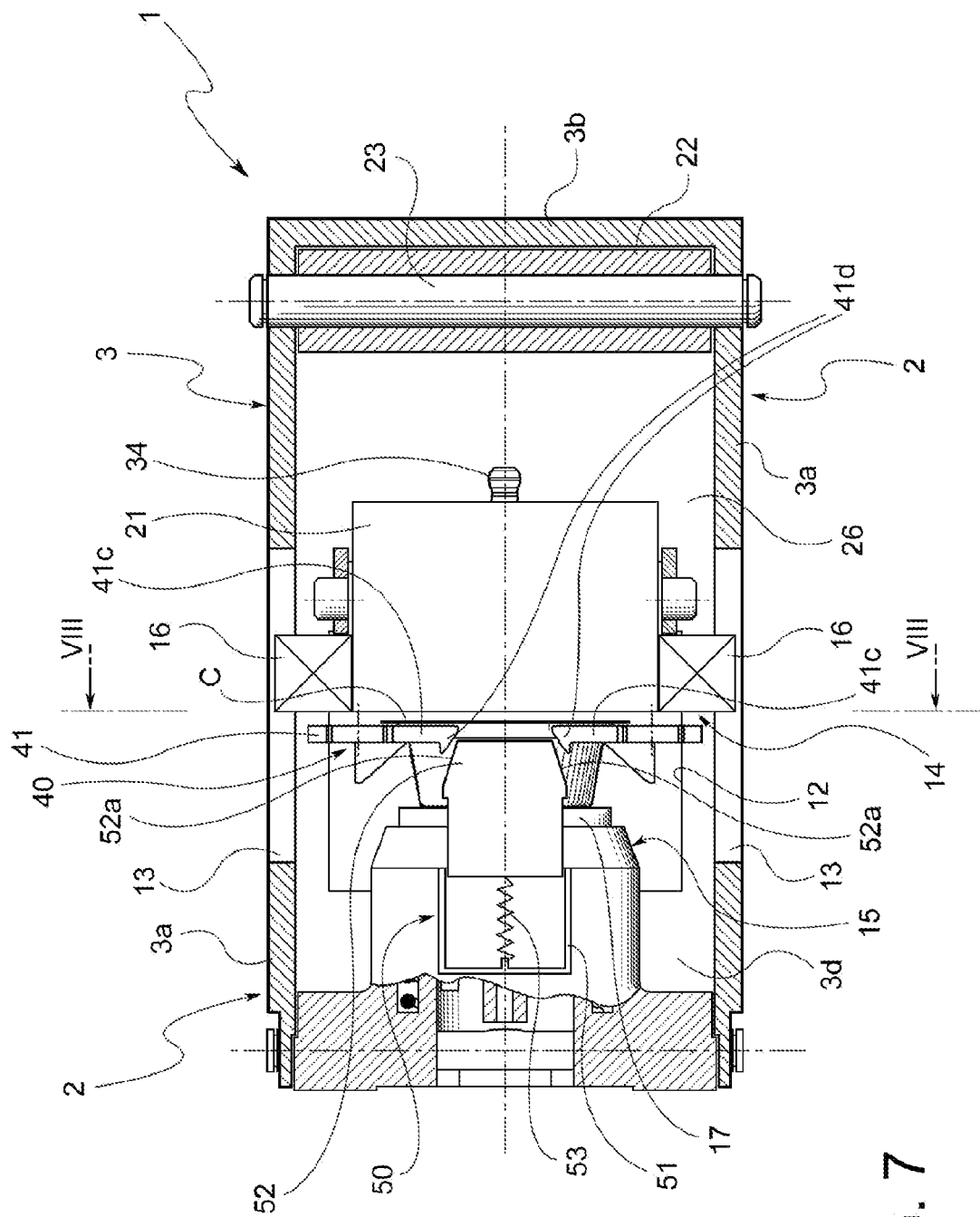
Figure 8:
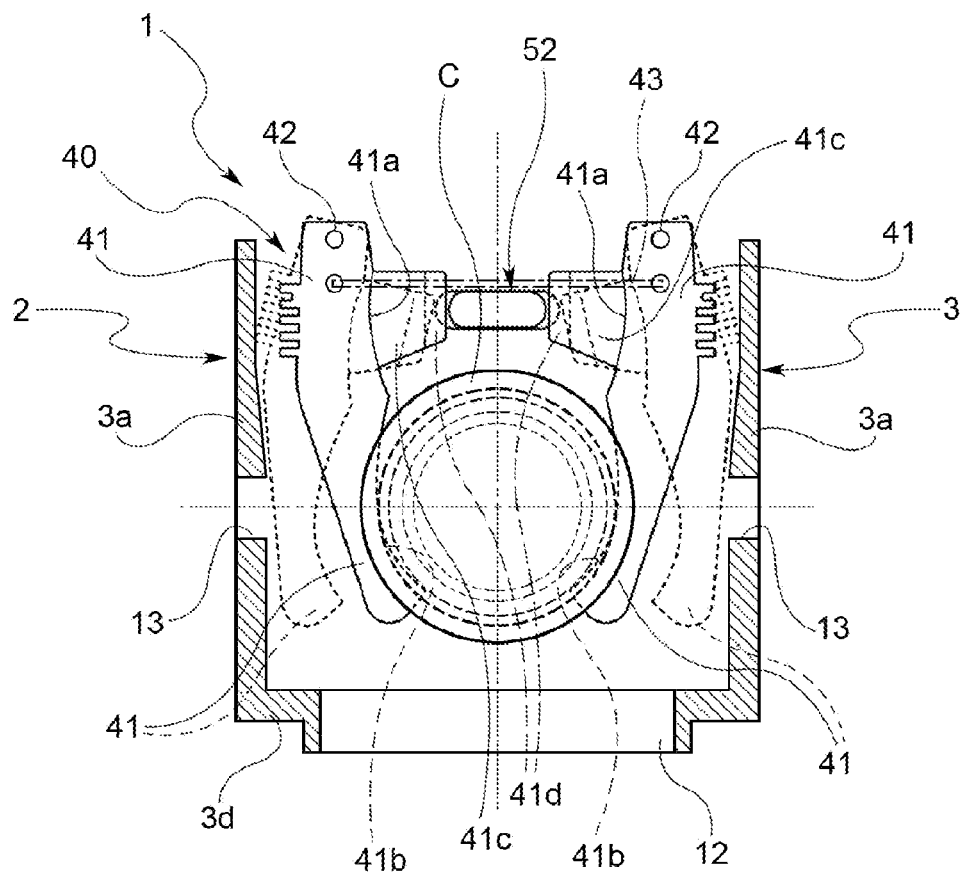
FIG. 8 is a partial sectional view along the line VIII-VIII of FIG. 6.

After a certain translational stroke, the movable assembly 14 reaches the state of FIG. 7, in which the feeler protuberances 41d of the jaws 41 interfere with the distal part of the slanted surfaces 52a of the opening member 52. Starting from that state, the further translation of the movable assembly 14 towards the cooperating assembly 15 results in progressive opening out of the jaws 41, through the effect of engagement of the feeler protuberances 41d with the slanted surfaces 52a. In that step, the feeler member 52 remains almost stationary by virtue of the strong resistance opposed by the spring 53 to its rearward movement.

Figure 9:
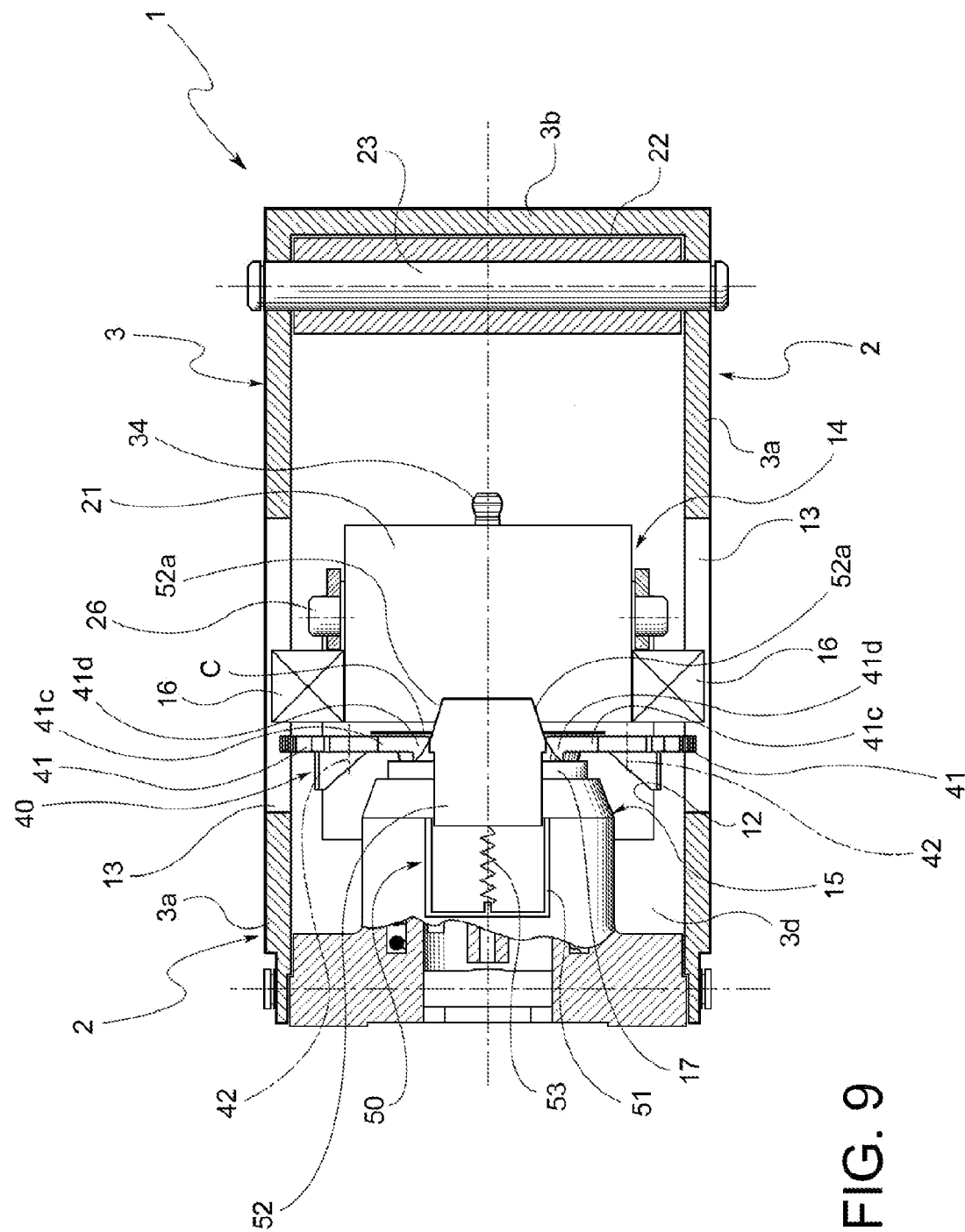
FIGS. 9 and 10 are views similar to FIGS. 6 and 7, and show two successive steps of the stroke for closure of the infusion chamber.

The state of FIG. 9 is then reached, in which the opening member 52 brings about the maximum opening of the jaws 51. In this state, the capsule C has already been to a great extent introduced into the hollow body 18 of the cooperating assembly 15, and therefore cannot drop by gravity.

In the end phase of the displacement of the movable assembly 14 towards the position for coupling to the cooperating assembly 15, the gripper type holding device 40, with the jaws 41 wide open, is capable of urging the opening member 52 towards an axially set back position, against the action of the spring 53, until the assemblies 14 and 15 are coupled to each other in a liquid-tight manner, with the capsule C interposed therebetween (FIG. 10).

Following the closure of the infusion chamber, the bottom of the body 19 and the lid 20 of the capsule C are lacerated by the perforating devices 20 and, respectively, 31 of the two assemblies 15 and 14. By way of the movable assembly 14 there can then be injected into the infusion chamber, via the perforated capsule C, a flow of hot water and/or steam, for the preparation of a beverage which, in a manner which is not illustrated, is conveyed from the chamber 27 of the cooperating assembly 15 towards a collecting container, such as a small cup or glass.

After the infusion, by means of the lever 10 the movable assembly 14 may be gradually distanced from the cooperating assembly 15, in order to be brought back to the opening state shown in FIGS. 1 and 2. In the initial phase of the return displacement of the assembly 14, the opening member 52, under the strong thrust of the reaction spring 53, maintains the gripper type holding device 40 with the jaws 41 wide open, for a predetermined stroke of the movable assembly 14, so as to allow the exhausted capsule C to be released and be evacuated by dropping through the aperture 12 of the support and guide structure 2.

The further displacement of the movable assembly 14 towards the starting position permits the gradual re-closing of the jaws 41, and the rearrangement of the opening member 52 in the advanced position which it occupied at the start of the operating cycle.

The infusion apparatus according to the present invention makes it possible to ensure the release and evacuation of the exhausted capsules in a reliable and secure manner, and by the use of simply and economically produced means.

In a variant which is not illustrated, the jaw device 40 can be associated with the cooperating assembly 15 (as well as with the movable assembly 14) and in that case the opening means 50 are to be connected to the movable assembly 14 (as well as to the cooperating assembly 15).

The infusion apparatus 1 need not necessarily be provided with a pusher member for urging the capsule C into engagement with the profiles 41b of the jaws 41, since the arrangement may be provided in such a way that the capsule will engage said profiles by gravity. Moreover, the jaws 41 may each be formed with only the profile 41b, in order to receive and retain a capsule in only one position, corresponding to the position illustrated in FIG. 5.

Naturally, the principle of the invention remaining the same, the forms of embodiment and details of construction may be varied widely with respect to those described and illustrated purely by way of non-limiting example, without thereby departing from the scope of the invention as defined in the attached claims.

The invention claimed is:

1. An infusion apparatus (1) for preparing a beverage by using a capsule (C), containing a quantity or dose of a substance for the preparation of the beverage, comprising
a support and guide structure (2) stationary in operation, in which there are mounted a horizontal movable assembly (14) and
an associated cooperating assembly (15) which is substantially stationary;
the movable assembly (14) being adapted to assume a closing position in which it couples with the cooperating assembly (15) to define therewith an infusion chamber, and a spaced-apart opening position;
between said assemblies (14, 15) there being provided a gripper type holding device (40) including a pair of movable jaws (41), mounted pivotally about horizontal axes which are parallel to the direction of displacement of the movable assembly (14), said jaws (41) being adapted to assume a relative holding position in which they are capable of receiving and retaining a capsule (C) or the like, introduced between said assemblies (14, 15) while the latter are in the spaced-apart opening position;
said jaws (41) being adapted to be opened by opening means (50) for releasing the held capsule (C), when said movable assembly (14) approaches the closing position, to allow said capsule (C) to be positioned in the infusion chamber (27);
the apparatus (1) being characterized in that
the opening means (40) comprise a bearing structure (51) associated with one (14) of said assemblies (14, 15) and an opening member (52) movable with respect to said bearing structure (51) in the direction of displacement of the movable assembly (14);
the opening member (52) has associated reaction means (53) tending to keep it in an advanced position in which, when the movable assembly (14) approaches the closing position, said opening member (52) is capable of interfering with the gripper type holding device (40) and causing the jaws (41) thereof to be opened wide
the arrangement being such that
in an end phase of the displacement of the movable assembly (14) towards the closing position the gripper type holding device (40), with the jaws (41) wide open, is capable of urging the opening member (52) towards a rearward position, against the action of the associated reaction means (53), and
in an initial phase of the return displacement of the movable assembly (14) towards the opening position, the opening member (52), under the action of said reaction means (53), is capable of maintaining the gripper type holding device (40) with jaws (41) wide open for a predetermined stroke of the movable assembly (14) which is adapted to allow the exhausted capsule (C) to be released, wherein the movable assembly (14) is provided with means (34) capable of allowing the injection of a flow of hot water into the infusion chamber (27) when said assemblies (14, 15) are in the closed condition.

2. An infusion apparatus according to claim 1, wherein the gripper type holding assembly (40) is carried by the movable assembly (14) and the opening means (50) are connected to the cooperating assembly (15).

3. An infusion apparatus according to claim 1, wherein the infusion chamber 27 is defined in said cooperating assembly (15) and is sealed in a liquid-tight manner as a consequence of the mutual coupling of said assemblies (14, 15).

4. An infusion apparatus according to claim 1, wherein the opening member (52) has a pair of slanted converging surfaces (52*a*) adapted to cooperate with corresponding feeler formations (41*d*) of the jaws (41) of the gripper type holding device (40).

5. An infusion apparatus according to claim 1, wherein the reaction means associated with the opening member (52) comprise a spring (53) having a predetermined stiffness.

\* \* \* \* \*